US008601552B1

(12) United States Patent
Bowers et al.

(10) Patent No.: US 8,601,552 B1
(45) Date of Patent: Dec. 3, 2013

(54) PERSONAL IDENTIFICATION PAIRS

(75) Inventors: Kevin D. Bowers, Melrose, MA (US); Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 771 days.

(21) Appl. No.: 12/748,690

(22) Filed: Mar. 29, 2010

(51) Int. Cl.
*G06F 21/00* (2013.01)

(52) U.S. Cl.
USPC ............................... 726/5; 713/182

(58) Field of Classification Search
USPC .......................... 726/5, 7; 713/182
See application file for complete search history.

(56) References Cited

U.S. PATENT DOCUMENTS

| | | | |
|---|---|---|---|
| 6,240,184 | B1 | 5/2001 | Huynh et al. |
| 7,219,368 | B2 | 5/2007 | Juels et al. |
| 7,461,399 | B2 | 12/2008 | Juels et al. |
| 2007/0236330 | A1* | 10/2007 | Cho et al. ................. 340/5.54 |
| 2008/0098464 | A1* | 4/2008 | Mizrah ....................... 726/5 |
| 2009/0165121 | A1* | 6/2009 | Kumar ....................... 726/19 |
| 2011/0029400 | A1* | 2/2011 | Scipioni ................. 705/26.4 |
| 2011/0095992 | A1* | 4/2011 | Yeh ........................... 345/173 |
| 2012/0159583 | A1* | 6/2012 | Griffin et al. .................. 726/5 |
| 2013/0157729 | A1* | 6/2013 | Tabe ........................... 455/573 |
| 2013/0169568 | A1* | 7/2013 | Park et al. ................... 345/173 |

OTHER PUBLICATIONS

"Security Through Pretty Pictures: The Unlock Pattern," Fun with Android, http://funwithandroid.com/2009/01/13/ security-through-pretty-pictures-the-unlock-pattern/, Jan. 13, 2009, downloaded Oct. 28, 2011.
Suo et al., "Graphical Passwords: A Survey," Proceedings of Annual Computer Security Applications Conference, 2005, 10 pages.
Vantage Magazine, vol. 6, No. 2, Fall 2009, RSA, The Security Division of EMC, p. 22, http://www.rsa.com/newsletter/Vantage/Fall2009/10486_RSAMagazine.pdf, downloaded Mar. 3, 2010.

\* cited by examiner

*Primary Examiner* — Samson Lemma
(74) *Attorney, Agent, or Firm* — BainwoodHuang

(57) ABSTRACT

A method by which a computer system authenticates a user is provided. The method includes (a) displaying a plurality of unique elements to a user on a display device, (b) receiving a set of points corresponding to a sweeping motion performed by the user with respect to the display device, (c) determining a pair of unique elements of the plurality of unique elements defined by endpoints of the sweeping motion, and (d) authenticating the user only if the pair of unique elements is associated for authentication purposes with the user. An apparatus and computer program product for performing the method are also provided.

17 Claims, 5 Drawing Sheets

PERSONAL IDENTIFICATION PAIRS

BACKGROUND

In a conventional authentication system, a user enters a personal identification number (PIN) into a device in order to authenticate to an authentication server. For example, a bank customer inserts his bank card into an automatic teller machine (ATM) and types a 4-digit PIN onto a keypad, followed by enter. The PIN is then sent to the bank's authentication server, which determines if the entered PIN is associated with the customer's bank account.

The keypad typically includes digits 0-9 as well as a few additional buttons (e.g., enter, cancel, etc.). Thus, the PIN space contains about 10,000 possible passwords, and the bank customer is able to authenticate by pressing 5 buttons in sequence (i.e., the four digits of the PIN followed by enter).

SUMMARY

Although the conventional system works acceptably, it would be desirable for a user to be able to authenticate more quickly and more easily by performing fewer motions. It would also be desirable to increase the size of the PIN space without increasing the number of motions. It would also be desirable for the user to be able to remember his PIN more easily.

Embodiments of the current invention provide alternatives which satisfy these desires by allowing a user to authenticate by performing one or more sweeping motions on a screen, optionally using patterns and/or colors to aid the user in remembering his authentication code.

A method by which a computer system authenticates a user is provided. The method includes (a) displaying a plurality of unique elements to a user on a display device, (b) receiving a set of points corresponding to a sweeping motion performed by the user with respect to the display device, (c) determining a pair of unique elements of the plurality of unique elements defined by endpoints of the sweeping motion, and (d) authenticating the user only if the pair of unique elements is associated for authentication purposes with the user. An apparatus and computer program product for performing the method are also provided.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the current invention provide alternatives to a conventional PIN-based authentication by allowing a user to authenticate by performing one or more sweeping motions on a screen, optionally using patterns and/or colors to aid the user in remembering his authentication code.

Figure 1:
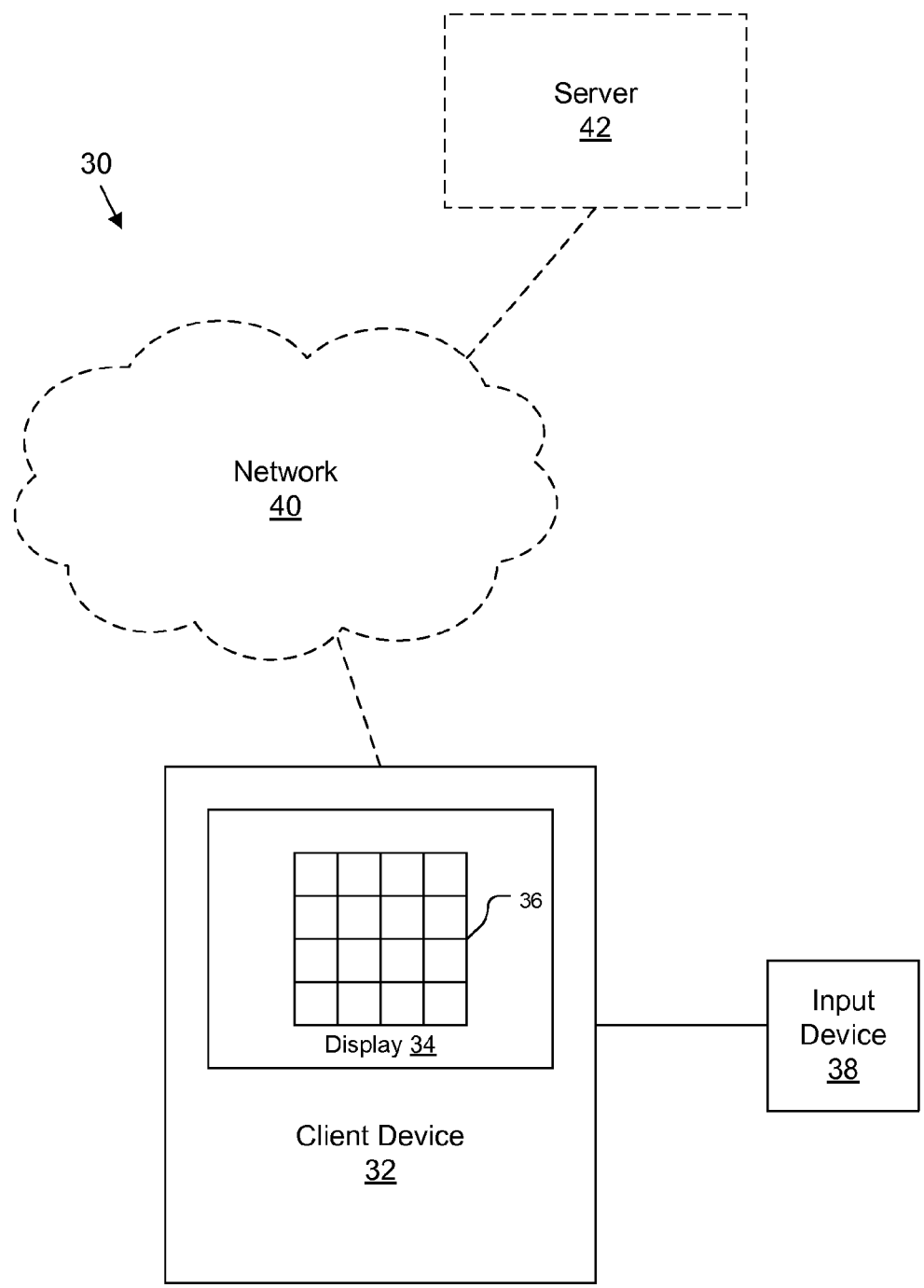
FIG. 1 illustrates a system for use in performing various embodiments.

FIG. 1 depicts a system 30 for use in performing various embodiments of the present invention. System 30 includes a client device 32. In some embodiments, client device 32 is an ATM. In other embodiments, client device 32 is a handheld device such as a cellular phone, a personal organizer, or a tablet personal computer. In other embodiments, client device 32 may be any type of computer. Client device 32 includes a display screen 34. Display screen 34 may be configured to display an authentication grid 36, which allows a user to enter his authentication information using input device 38. In one embodiment, display screen 34 is a typical computer display such as an LCD screen, an LED screen, a plasma screen, or a CRT screen, and input device 38 is a mouse, touchpad, trackball, or similar device which allows a user to simulate motion on the display screen 34. In another embodiment, display screen 34 is a touch-sensitive screen, and input device 38 is either just the user's finger or a stylus held by the user, or a similar device that allows the user to directly select a portion of the display screen 34. Although display screen 34 is depicted as being located within client device 32, in some embodiments, display screen 34 may be external to the client device 32.

In some embodiments, client device 32 connects, via a network 40 (e.g., the Internet, a LAN, a WAN, etc.) to a remote authentication server 42. In some embodiments, all authentication may be performed locally at the client device 32. In other embodiments, the authentication procedure may be performed partially by the client device 32 and partially by the server 42.

Figure 2:
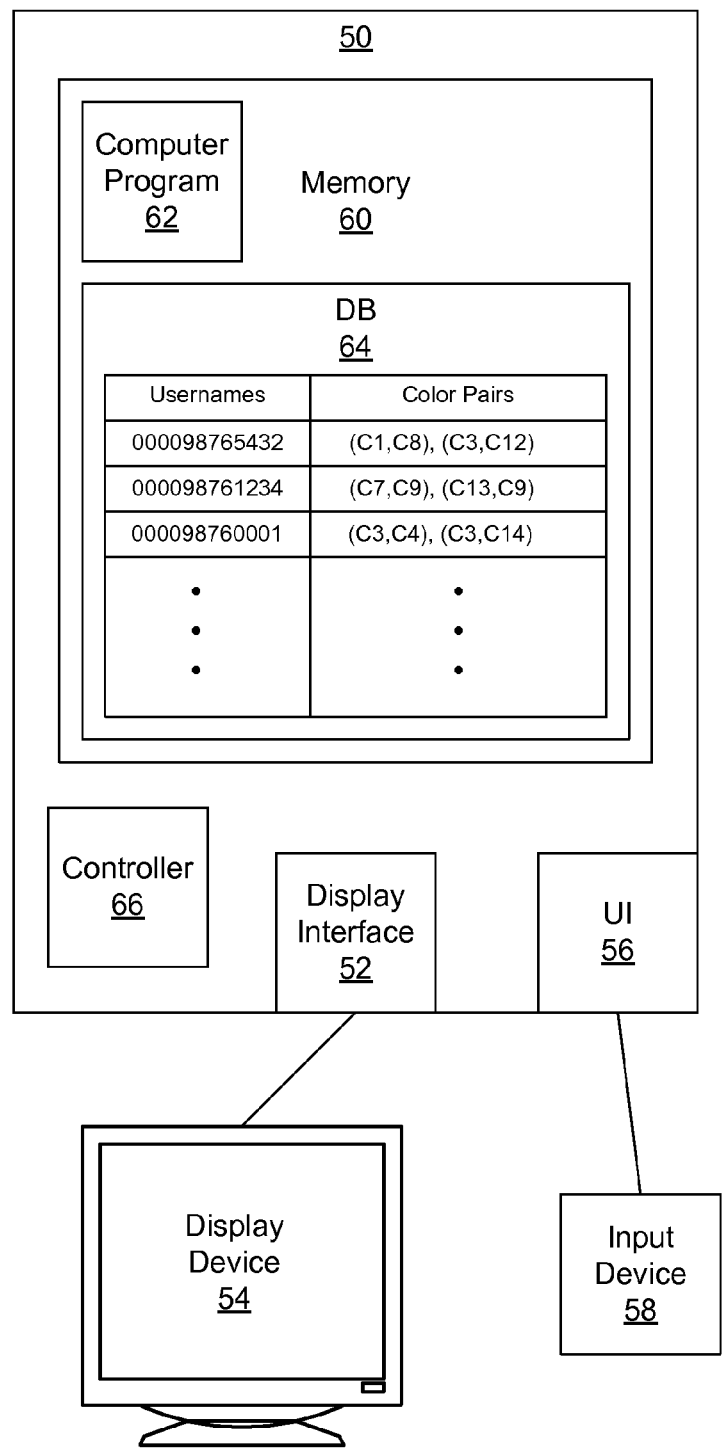
FIG. 2 illustrates an apparatus of one embodiment.

Because the authentication may be performed at either the client device 32, the server, 42, or both 32, 42, FIG. 2 depicts a generic apparatus 50, which represents various embodiments. Apparatus 50 may be the client device 32, or apparatus 50 may be the server device 42. In some embodiments, various features of apparatus 50 may be spread out between the client device 32 and the server 42.

Apparatus 50 contains a display interface 52 which connects to a display device 54. Apparatus 50 also contains a user interface (UI) 56, which connects to an interface device. Apparatus 50 also contains memory 60 and controller 66. Memory 60 may be any form of computer-readable memory, such as volatile system memory (e.g., RAM), non-volatile storage (e.g., hard disk, floppy disk, optical disk, flash drive, etc.), or any combination thereof. Memory 60 stores computer program 62, which includes a set of instructions for performing a method of one embodiment. Memory 60 also stores an account database (DB) 64. Account DB 64 stores a set of associations between a set of usernames and a set of pairs, such as color pairs. These pairs will be discussed in further detail below. Some or all of the contents of account DB 64 may be stored in encrypted form for security purposes. Controller 66 may be any kind of circuitry capable of performing instructions, such as, for example, a central processing unit (CPU), in which case, controller 66 performs instructions stored within computer program 62. Controller 66 may also be a collection of dedicated circuitry, capable of directly performing a set of instructions hard-coded in to the circuitry itself.

When the authentication is performed locally at the client device 32, then apparatus 50 is the client device, and display device 54 is the display screen 34. Input device 38 is then equivalent to input device 38.

When the authentication is performed remotely at the server device 42, then apparatus 50 is the server 42, and display device 54 is the client device 54 containing display screen. In that case, input device 58 is also the client device 32, which connects to local input device 38. In this case, display device 54 and input device 58 (acting together as client device 32) connect to apparatus 50 across network 40.

When the authentication is performed at both devices 32, 42, then display device 54 is the display screen 34 and display interface 52 is located within client device 52, while input device 58 is input device 38 and UI 56 is located within client device 52. Client device 32 may also contain a controller for performing some aspects of the authentication process. The remaining elements of apparatus 50 are found within the server 42.

When the authentication is performed remotely at the server device 42 or at both devices 32, 42, a secure channel may be set up between the devices 32, 42 over network 40 so that authentication data may be transmitted across network 40 without being compromised or stolen.

In any case, display screen 34 displays an authentication grid 36. At a minimum, authentication grid 36 contains a set of more than two unique elements 68. In some embodiments, the unique elements 68 are laid out in a grid, as depicted in FIGS. 3 and 4.

Figure 3:
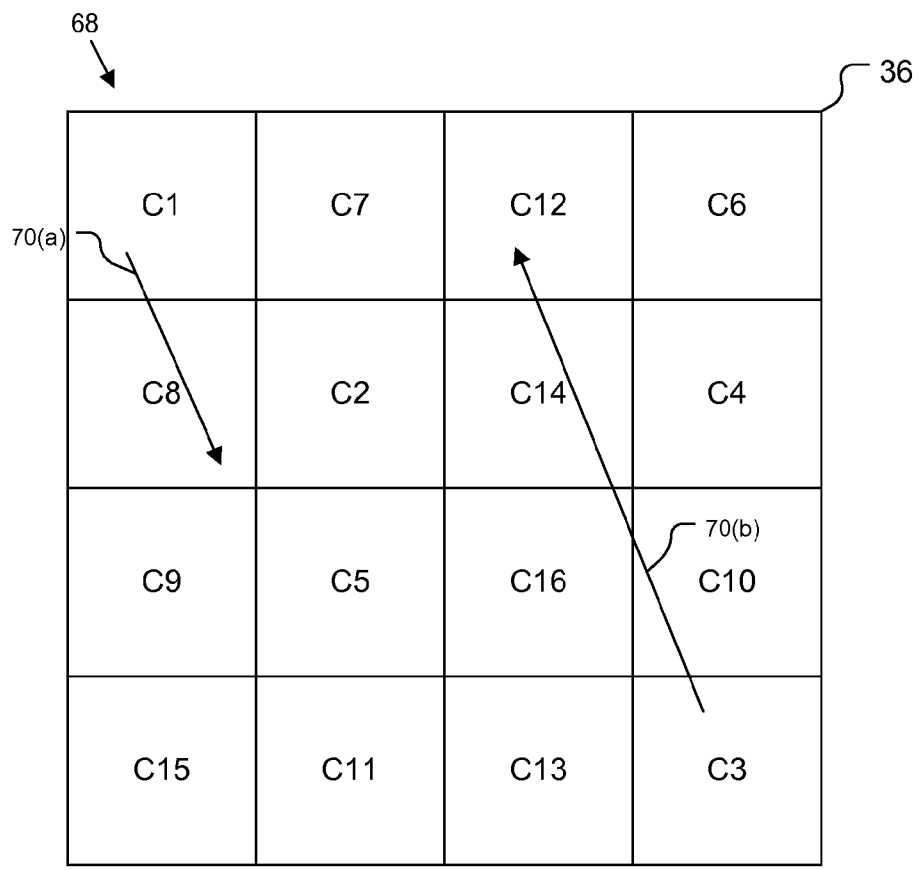
FIG. 3 illustrates a display screen and sweeping motions used in one embodiment.
Figure 4:
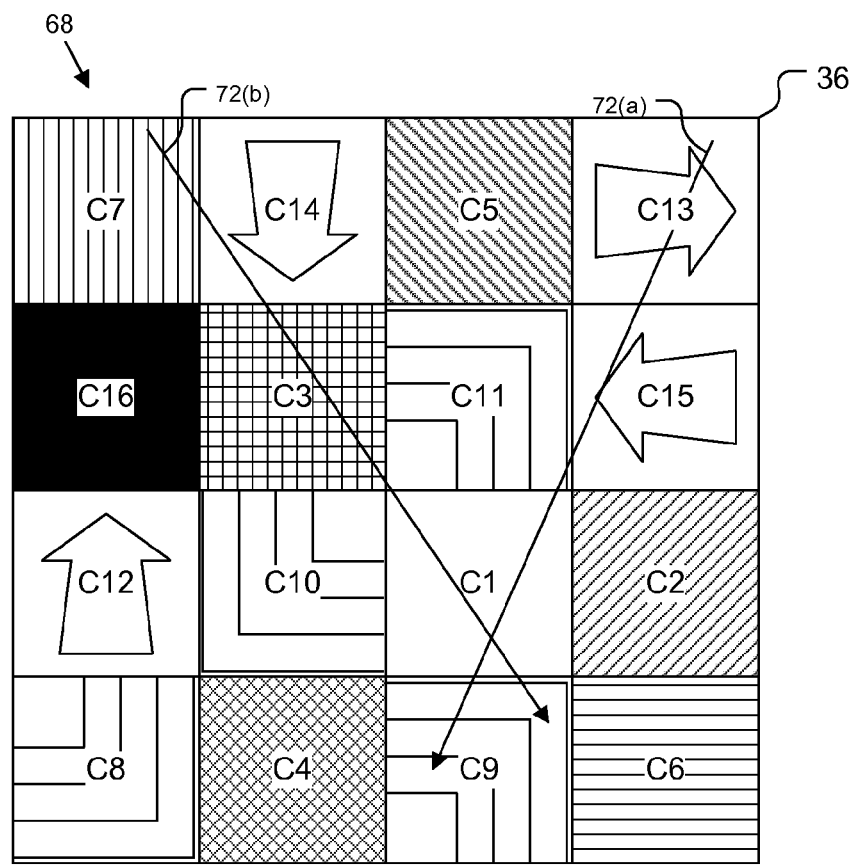
FIG. 4 illustrates a display screen and sweeping motions used in another embodiment.

In FIG. 3, authentication grid 36 includes 16 unique elements 68 laid out in a 4×4 grid. Each unique element 68 is depicted on the display screen 34 by a separate color. Thus, the top row of unique elements 68 in FIG. 3, from left to right is depicted with colors C1, C7, C12, and C6, respectively. Sixteen total colors C1-C16 are used. In one embodiment, the colors C1-C16 are defined as follows:

C1=White
C2=Red
C3=Orange
C4=Yellow
C5=Green
C6=Blue
C7=Violet
C8=Cyan
C9=Tan
C10=Gold
C11=Silver
c12=Copper
C13=Pink
C14=Brown
C15=Grey
C16=Black In one embodiment, each unique element 68 displays a unique one of these colors C1-C16 as a solid block of color. The user then makes one or more sweeping motions 70 on the screen to choose one or more pairs of colors C1-C16. A sweeping motion is a motion defined with respect to the display screen 34 having 2 endpoints. A first endpoint of the sweeping motion is located within a first unique element 68. The motion then passes along the display screen 34 (entirely within the authentication grid 36) until coming to a stop at a second endpoint, located within a second unique element 68. The sweeping motion may pass through other unique elements along the path from the first endpoint to the second endpoint. In some embodiments, the sweeping motion should be substantially linear, while in other embodiments, it need not be substantially linear.

For example, in FIG. 3, the user may make a first sweeping motion 70(a) to indicate the color pair (C1, C8), which corresponds to (White, Cyan). In one embodiment, the color pair is an ordered color pair which is distinct from (Cyan, White). The user may also make a second sweeping motion 70(b) to indicate a second color pair (C3, C12), which corresponds to (Orange, Copper). Additional sweeping motions beyond two may also be used in some embodiments to enhance security.

Using a 4×4 grid with 16 colors is advantageous in that if two sweeping motions 70(a), 70(b) are made by the user, the user is able to perform the authentication with a mere 2 motions, while the space of possible sweeping motions is 16×15×16×15=57,600, which is greater than the 10,000 possibilities for a 4-digit PIN requiring 4 or 5 motions by the user! It is also advantageous because it appears to be easier for humans to remember a sequence of colors than to remember a sequence of numbers. If an even larger space of possible sweeping motions is required for enhanced security, 3 or more sweeping motions may be required.

The location of the unique elements 68 on the authentication grid 36 may be fixed or may vary. In some embodiments, the authentication grid 36 remains the same every time a user attempts to authenticate. In other embodiments, every time a user attempts to authenticate, the location of the various unique elements 68 on the authentication grid 36 varies. This varying may be done randomly, pseudo-randomly, or according to a fixed chaotic pattern. Thus, at one time, the authentication grid 36 may appear as in FIG. 3, with the unique element 68 with color C1 appearing at the top left corner, but at a later time, the unique element 68 with color C1 may instead appear at the top right corner or elsewhere.

Varying the location of the unique elements 68 on the authentication grid 36 from time to time is advantageous because it makes it difficult for an onlooker to determine the user's color choices merely by seeing the motion of the user's hand. Since the positions of the unique elements 68 are not fixed, if the onlooker were to later attempt to replicate the user's movements in a fraudulent login attempt, the onlooker would likely fail as the unique elements 68 would then be in a different configuration.

In FIG. 4, another embodiment is depicted. In this embodiment, display screen 36 also displays a set of unique elements 68 arranged in a 4×4 grid. However, in this embodiment, each unique element 68 has a unique pattern associated with it. Thus, display screen 34 displays the unique elements 68 by drawing a unique pattern at each grid location. In some embodiments, each unique element is also associated with a particular color C1-C16 in addition to a particular pattern. Thus, in FIG. 4, the unique element in the top left corner is displayed as a set of parallel vertical violet lines, while the unique element directly beneath it is displayed as a solid block of black. FIG. 4 also depicts two additional sweeping motions 72(a), 72(b). Sweeping motion 72(a) is a sweeping motion from a pink right arrow to a tan set of bent lines (with the corner of the pattern towards the top right), which may be represented as (C13, C9). Sweeping motion 72(b) is a sweeping motion from parallel vertical violet lines to a tan set of bent lines (with the corner of the pattern towards the top right), which may be represented as (C7, C9).

Figure 5:
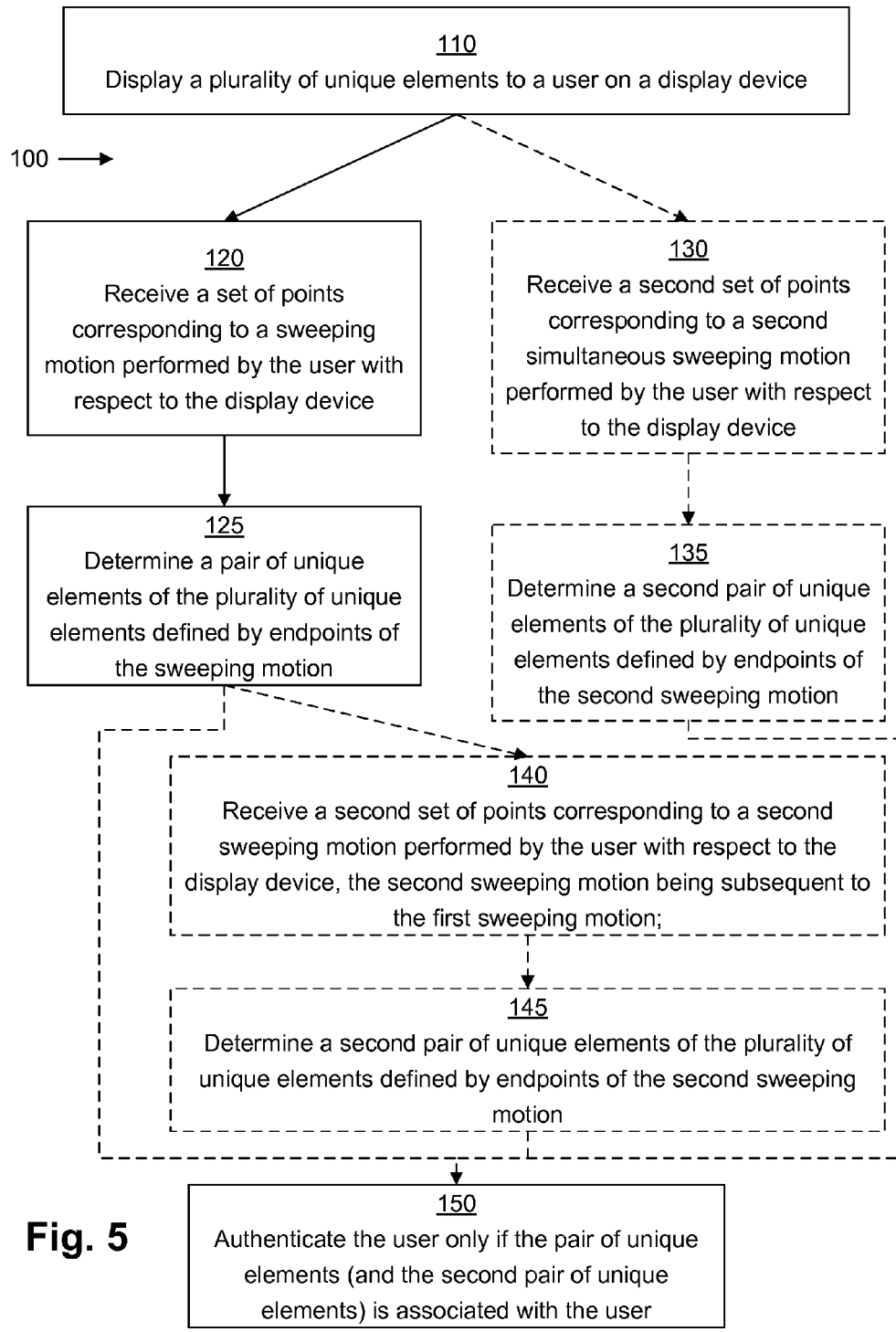
FIG. 5 illustrates a method of various embodiments.

FIG. 5 depicts an authentication method 100 of various embodiments, performed by apparatus 50. In one embodiment, the method 100 is performed by the controller 66 while performing the instructions stored in computer program 62 (henceforth referred to as being performed by the computer program 62, for brevity).

In step 110, computer program 62 directs display interface to display a plurality of unique elements 68 to a user on display device 54. As mentioned above, display device 54 may be local to the apparatus 50 or remote, depending on the particular embodiment. The plurality of unique elements 68 may be displayed on the display device 54 according to the embodiments described above in connection with FIGS. 3 and 4, or in various other configurations. In one embodiment, step 110 is performed in response to a user inserting a bank card into an ATM. In another embodiment, step 110 is performed in response to a user loading a secure website into a browser.

In some embodiments, the user may request a shuffling of the unique elements 68 on the fly. For example, if the user was about to perform the sweeping motion(s), but then noticed that a suspicious-looking onlooker had glanced at the arrangement of authentication grid 36, the user might be concerned that the onlooker would be able to determined his color pairs merely by seeing the user's subsequent hand motions. In order to overcome this possibility, in one embodiment the user has the option to request a re-shuffling of the unique elements 68 on the authentication grid. For example, if the user is using a smartphone with a built-in accelerometer, the user might shake the device to request a re-shuffling. In other embodiments, the user could push a button or use any other known means of issuing a command to request a re-shuffling. Once the re-shuffling request has been received by the computer program 62, step 110 may be repeated, this time with a different set of locations for the unique elements 68, since the arrangement varies (randomly) from authentication to authentication.

In step 120, computer program 62 receives a set of points corresponding to a sweeping motion performed by the user with respect to the display device 54. In some embodiments, the user directly touches display screen 34 of display device 54 at a first point with a touching implement and sweeps that touching implement along the touch-sensitive screen until coming to a complete stop at a second point. In one embodiment, the touching implement is a first finger of the user. In another embodiment, the touching implement may be a stylus or a similar device. In some embodiments, the user uses a mouse or similar device to click on the first point with a cursor and drag the cursor to the second point. In embodiments in which the method 100 is performed both at the client device 32 and the server device 42, this step is typically performed at the client device.

In one embodiment, step 130 is performed simultaneously with step 120. In step 130, computer program 62 receives a second set of points corresponding to a second simultaneous sweeping motion performed by the user with respect to the display device 54. In this embodiment, the user uses two fingers to simultaneously make two sweeping motions on the touch-sensitive screen of display device 54. The user directly touches display screen 34 of display device 54 at a third point with a second finger and sweeps that second finger along the touch-sensitive screen until coming to a complete stop at a fourth point. In embodiments in which the method 100 is performed both at the client device 32 and the server device 42, this step is typically performed at the client device.

In step 125, which follows from step 120, computer program 62 determines a pair of unique elements 68 defined by endpoints of the sweeping motion performed by the user. The computer program, 62 determines which unique element 68 each of the first and second points received in step 120 falls in. For example, after sweeping motion 70(a) of FIG. 3, computer program 62 would determine that the endpoints fell in unique elements corresponding to colors C1 and C8. This may be represented as (C1, C8). In embodiments in which the method 100 is performed both at the client device 32 and the server device 42, this step may be performed at either the client device 32 or the server device 42, depending on the particular embodiment.

In one embodiment, step 135 is performed approximately simultaneously with step 125. In such a case step 135 follows from step 130. In step 135, computer program 62 determines a second pair of unique elements 68 defined by endpoints of the second sweeping motion performed by the user. The computer program, 62 determines which unique element 68 each of the third and fourth points received in step 130 falls in. For example, after sweeping motion 70(b) of FIG. 3, computer program 62 would determine that the endpoints fell in unique elements corresponding to colors C3 and C12. This may be represented as (C3, C12). In embodiments in which the method 100 is performed both at the client device 32 and the server device 42, this step may be performed at either the client device 32 or the server device 42, depending on the particular embodiment.

It should be understood that in some embodiments, the details may vary. For example, in one embodiment, when sweeping motions 70(a) and 70(b) are performed simultaneously, instead of pairs (C1, C8) and (C3, C12) being indicated, pairs (C1, C3) and (C8, C12) would be indicated. In such a case, the first pair is defined by simultaneous touching and the second pair is defined by a second set of multiple touching, the sweeping motions serving to link the two sets.

In some embodiments (when steps 130 and 135 are omitted), steps 140 and 145 may follow from step 125. In step 140, computer program 62 receives a second set of points corresponding to a second sweeping motion performed by the user with respect to the display device 54 after the first sweeping motion. In some embodiments, the user, after completing the first sweeping motion, directly touches display screen 34 of display device 54 at a third point with a touching implement and sweeps that touching implement along the touch-sensitive screen until coming to a complete stop at a fourth point. In one embodiment, the touching implement is a first finger of the user. In another embodiment, the touching implement may be a stylus or a similar device. In some embodiments, after completing the first sweeping motion, the user uses a mouse or similar device to click on the third point with a cursor and drag the cursor to the fourth point. In embodiments in which the method 100 is performed both at the client device 32 and the server device 42, this step is typically performed at the client device.

In step 145, which follows from step 140, computer program 62 determines a pair of unique elements 68 defined by endpoints of the sweeping motion performed by the user. The computer program, 62 determines which unique element 68 each of the third and fourth points received in step 120 falls in. For example, after sweeping motion 70(b) of FIG. 3, computer program 62 would determine that the endpoints fell in unique elements corresponding to colors C3 and C12. This may be represented as (C3, C12). In embodiments in which the method 100 is performed both at the client device 32 and the server device 42, this step may be performed at either the client device 32 or the server device 42, depending on the particular embodiment.

Step 150 follows. In embodiments where only one sweeping motion is performed, step 150 follows directly from step 125. In embodiments where two simultaneous sweeping motions are performed, step 150 follows directly after steps 125 and 135 are complete. In embodiments where two sequential sweeping motions are performed, step 150 follows directly after step 145. In embodiments in which the method 100 is performed both at the client device 32 and the server device 42, step 150 is always performed at the server device.

In step 150, computer program 62 authenticates the user only if the pair of unique elements is associated with the user in an authentication context. Computer program 62 performs a lookup in account DB 64 using the user's username or account number as the index. A cryptographic operation may be required, particularly if the pairs stored in account DB are stored in encrypted form (which helps prevent someone with direct access to the hardware from accessing the pairs). If the pair of unique elements is not found in the account DB 64 at that spot, the user is denied authentication. In embodiments where two simultaneous or sequential sweeping motions are performed, the second pair of unique points is also compared to the values stored in the account DB 64.

For example, if a bank customer with bank account number 000098765432 inserts his ATM card into an ATM, the ATM will display an authentication grid 36. If the authentication grid 36 of FIG. 3 is displayed and the customer makes sweeping motions 70(*a*) and 70(*b*), then in step 150, the customer will be authenticated, because sweeping motions 70(*a*) and 70(*b*) correspond to pairs (C1, C8) and (C3, C12), which are found in the line of account DB 64 corresponding to username 000098765432. In some embodiments, when entered sequentially, these pairs must be entered in the same order as stored in user DB 64. In some embodiments, particularly when entered simultaneously, these pairs need not be entered in the same order as stored in user DB 64.

In the ATM context, method 100 is typically performed at both the client device 32 and the server device 42. Typically, only step 150 is performed at the bank's server 42, while the remaining steps are performed at the client ATM 32, however, in some cases, step 125 (and corresponding optional steps 135 or 145) are also performed at the bank's server 42.

As an additional example, if a user of a smartphone wishes to log into the website of his credit card company in order to review his credit card account, the user might open up the credit card website on the client device 32 (corresponding to the smartphone) and enter his credit card number, e.g., 000098761234. In this case, step 110 would be performed by the credit card server 42. For example, upon receiving the request to log in, bank's server 42 may send the authentication grid 36 of FIG. 4 to the client device 32 to be displayed on the display screen 34. At this point, the exact order of the unique elements 68 within the authentication grid 36 can be randomly assigned by the computer program 62 at the bank server 42 (e.g., using the current time and/or the user's credit card number as seeds to a pseudo-random number generator). Step 120 (and corresponding optional steps 130 or 140), however, would be performed locally by the graphical user interface of the smartphone's operating system and the web browser of the client device 32. Then the user might make sweeping motions 70(*a*) and 70(*b*). The smartphone would then send the points across the cellular network and Internet to the credit card server 42, where the computer program 62 would then perform step 125 (and corresponding step 135 or 145) to identify the particular unique elements that the endpoints of the sweeping motions correspond to, in this case (C7, C9) and (C13, C9). Finally, computer program 62 would perform step 150 at bank server 42 to determine that the pairs (C7, C9) and (C13, C9) are indeed found in account DB 64 at the line associated with credit card number 000098761234.

In some embodiments, steps 120 and 140 include the substep of determining that the set of points that the user sweeps are substantially co-linear. This may be done by choosing a center line from the first endpoint to the second endpoint (or the third endpoint to the fourth endpoint) and examining the set of points that the user has swept through to determine if any point is more than a threshold distance from the center line. Alternatively, regression may be applied to the set of points to see if they correspond to the center line. If the set of points corresponds to the center line with a coefficient of correlation that is less than (in absolute value) a threshold value (e.g., 0.9), then the line may not be said to be substantially linear. If the user attempts to sweep his finger (or stylus or cursor) from one point to another in a circuitous manner, then, in these embodiments, the attempt would be rejected. Such a circuitous motion would indicate either that the user was unsure about what the correct points were or that the user was not aware of the rule that the sweep should be substantially linear. Either reason would imply a reasonable to strong likelihood that the user was an imposter. However, in embodiments in which simultaneous sweeps are used, substantial co-linearity should not be required, since it may be difficult for a user to simultaneously sweep two straight lines with two fingers, especially if using only one hand.

Thus, various embodiments have been presented for performing an authentication using one or more sweeps between unique elements 68. Advantageously, a user may log into an account by making fewer motions than with a standard PIN, but yet maintain higher security due to the larger space of possible combinations and difficulty of snooping. The user also advantageously will be easily able to remember how to log in.

While various embodiments of the invention have been particularly shown and described, it will be understood by those skilled in the art that various changes in form and details may be made therein without departing from the spirit and scope of the invention as defined by the appended claims.

For example, although embodiments have been described as using sweeping motions, this is by way of example only. In some embodiments, a user may make a zig-zag motion between various unique elements 68 to define a triple or an n-tuple of unique elements that serve to authenticate the user. In other embodiments, a triple or n-tuple may be indicated by the user merely touching 3 or more unique elements 68 simultaneously.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. §102, such determination being a legal determination that depends upon many factors, not all of which are known to Applicants at this time.

We claim:

1. A method by which a computer system authenticates a user, the method comprising:
   displaying a plurality of unique elements to a user on a touch-sensitive display device at an authentication time, including, for each unique element, displaying a unique color of that unique element on a distinct portion of the display device;
   receiving, at the authentication time, a first set of points corresponding to a first sweeping motion performed by the user with respect to the display device, including:

receiving, at the authentication time, a first point defined by an initial location touched by a first touching implement of the user on the touch-sensitive display screen; and receiving all subsequent points defined by all subsequent locations touched by the first touching implement of the user on the touch-sensitive display screen until the first touching implement of the user loses contact with the touch-sensitive display screen, the first point and the subsequent points defining the first sweeping motion;

determining a first pair of unique elements of the plurality of unique elements defined by endpoints of the first sweeping motion;

receiving a second set of points corresponding to a second simultaneous sweeping motion performed by the user with respect to the touch-sensitive display screen using a second touching implement distinct from the first touching implement;

determining a second pair of unique elements of the plurality of unique elements defined by endpoints of the second sweeping motion, the second pair of unique elements being distinct from the first pair of unique elements; and authenticating the user only if both the first pair of unique elements and the second pair of unique elements are associated for authentication purposes with the user;

wherein the first touching implement is selected from a group consisting of a finger and a stylus and the second touching implement is selected from another group consisting of a finger and a stylus.

2. A method as in claim 1 wherein:
for each unique element, displaying the unique color of that unique element on the distinct portion of the display device, includes assigning the location of the particular distinct portion of the display device for each unique element at random at display time.

3. A method as in claim 2 wherein the method further comprises:
receiving a shuffle signal from the user;
re-displaying the plurality of unique elements to the user on the display device, wherein re-displaying the plurality of unique elements includes assigning the location of the particular distinct portion of the display device for each unique element at random at display time, the location of the plurality of unique elements varying after re-displaying the plurality of unique elements.

4. A method as in claim 1 wherein:
the plurality of unique elements includes exactly 16 unique elements, corresponding to 16 unique colors; and
the distinct portions of the display device for each unique element are arranged in a 4×4 grid.

5. A method as in claim 1 wherein:
each unique element also includes a unique pattern, each unique pattern corresponding to the particular unique color of that unique element; and
displaying the plurality of unique elements to the user on the display device includes, for each unique element, displaying the unique pattern of that unique element on the distinct portion of the display device which displays the unique color of that unique element.

6. A method as in claim 1 wherein:
each unique element of the plurality of unique elements includes a unique pattern; and
displaying the plurality of unique elements to the user on the display device includes, for each unique element, displaying the unique pattern of that unique element on a distinct portion of the display device.

7. A method as in claim 1 wherein:
receiving the first set of points corresponding to the sweeping motion performed by the user with respect to the display device includes determining that the first set of points are substantially co-linear; and
determining the first pair of unique elements of the plurality of unique elements defined by endpoints of the first sweeping motion includes:
determining a first unique element of the plurality of unique elements which is displayed on a region of the screen containing a first endpoint of the first sweeping motion; and
determining a second unique element of the plurality element of unique elements which is displayed on a region of the screen containing a second endpoint of the first sweeping motion.

8. A method as in claim 1 wherein:
the computer system, in which the method is performed, is a single client-side device; and
displaying the plurality of unique elements to the user on the display device includes displaying the plurality of unique elements on a display screen local to the client-side device.

9. A method as in claim 1 wherein:
the computer system, in which the method is performed, includes a client-side device and a server device, the client-side device and the server device being distinct entities at remote locations connected over a network connection;
displaying the plurality of unique elements to the user on the display device includes displaying the plurality of unique elements on a display screen local to the client-side device;
receiving the first set of points corresponding to the first sweeping motion is performed by the client-side device; and
authenticating the user only if both the first pair of unique elements and the second pair of unique elements are associated with the user is performed by the server device.

10. A method as in claim 9 wherein
determining the first pair of unique elements is performed by the client-side device; and
the method further comprises transmitting an identification of the first pair of unique elements from the client-side device to the server device across the network connection over a secure channel.

11. A method as in claim 9 wherein
the method further comprises transmitting an identification of the first set of points corresponding to the first sweeping motion from the client-side device to the server device across the network connection over a secure channel; and
determining the first pair of unique elements is performed by the server device.

12. A method as in claim 1 wherein:
the computer system, in which the method is performed, is a single server device; and
displaying the plurality of unique elements to the user on the display device includes displaying the plurality of unique elements on a remote display screen across a network connection.

13. An apparatus comprising:
a display interface connected to a touch-sensitive display device;

a user interface connected to the touch-sensitive display device;

memory, storing a set of associations between a set of users and a set of pairs of unique elements; and a controller, the controller configured to:
- direct the display device, via the display interface, to display a plurality of unique elements to a user on the touch-sensitive display device at an authentication time by, for each unique element, displaying a unique color of that unique element on a distinct portion of the display device;
- receive, from the user interface at the authentication time, a first set of points corresponding to a first sweeping motion performed by the user with respect to the display device by:
  - receiving, at the authentication time, a first point defined by an initial location touched by a first touching implement of the user on the touch-sensitive display screen; and
  - receiving all subsequent points defined by all subsequent locations touched by the first touching implement of the user on the touch-sensitive display screen until the first touching implement of the user loses contact with the touch-sensitive display screen, the first point and the subsequent points defining the first sweeping motion;
- determine a first pair of unique elements of the plurality of unique elements defined by endpoints of the first sweeping motion;
- receive, by the user interface, a second set of points corresponding to a second simultaneous sweeping motion performed by the user with respect to the touch-sensitive display screen using a second touching implement distinct from the first touching implement;
- determine a second pair of unique elements of the plurality of unique elements defined by endpoints of the second sweeping motion, the second pair of unique elements being distinct from the first pair of unique elements; and
- authenticate the user only if both the first pair of unique elements and the second pair of unique elements are associated with the user by one of the set of associations stored in memory;

wherein the first touching implement is selected from a group consisting of a finger and a stylus and the second touching implement is selected from another group consisting of a finger and a stylus.

14. An apparatus as in claim 13 wherein the touch-sensitive display device is a local device connected to the display interface and the user interface by a local connection.

15. An apparatus as in claim 13 wherein
the touch-sensitive display device is a remote device connected to the display interface and the user interface via a secure network connection.

16. A computer program product comprising a non-transitory computer-readable medium, the computer-readable medium storing instructions, which, when performed by a computerized device, cause the computerized device to:
- display a plurality of unique elements to a user on a touch-sensitive display device at an authentication time, including, for each unique element, displaying a unique color of that unique element on a distinct portion of the display device;
- receive, at the authentication time, a first set of points corresponding to a first sweeping motion performed by the user with respect to the display device, by:
  - receiving, at the authentication time, a first point defined by an initial location touched by a first touching implement of the user on the touch-sensitive display screen; and
  - receiving all subsequent points defined by all subsequent locations touched by the first touching implement of the user on the touch-sensitive display screen until the first touching implement of the user loses contact with the touch-sensitive display screen, the first point and the subsequent points defining the first sweeping motion;
- determine a first pair of unique elements of the plurality of unique elements defined by endpoints of the first sweeping motion;
- receive a second set of points corresponding to a second simultaneous sweeping motion performed by the user with respect to the touch-sensitive display screen using a second touching implement distinct from the first touching implement;
- determine a second pair of unique elements of the plurality of unique elements defined by endpoints of the second sweeping motion, the second pair of unique elements being distinct from the first pair of unique elements; and
- authenticate the user only if both the first pair of unique elements and the second pair of unique elements are associated with the user;

wherein the first touching implement is selected from a group consisting of a finger and a stylus and the second touching implement is selected from another group consisting of a finger and a stylus.

17. A method as in claim 1, wherein:
each unique element of the plurality of unique elements includes a visually unique aspect; and
displaying the plurality of unique elements to the user on the display device includes, for each unique element, displaying the visually unique aspect of that unique element on a distinct portion of the display device.

* * * * *